United States Patent
Huang et al.

(10) Patent No.: US 7,853,549 B2
(45) Date of Patent: *Dec. 14, 2010

(54) METHOD FOR RULE COMPLIANCE SITUATION CHECKING AND RELATED CHECKING SYSTEM

(75) Inventors: Ying Huang, Yorktown Heights, NY (US); Haiqi Liang, Beijing (CN); Ying Liu, Beijing (CN); Birgit Monika Pfitzmann, Samstagern (CH); Jian Wang, Beijing (CN); Xin Zhou, Beijing (CN); Jun Zhu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 189 days.

This patent is subject to a terminal disclaimer.

(21) Appl. No.: 12/187,107

(22) Filed: Aug. 6, 2008

(65) Prior Publication Data

US 2008/0301080 A1 Dec. 4, 2008

Related U.S. Application Data

(63) Continuation of application No. 11/511,772, filed on Aug. 29, 2006, now Pat. No. 7,496,552.

(30) Foreign Application Priority Data

Aug. 30, 2005 (CN) .................. 2005 1 0093480

(51) Int. Cl.
  *G06N 5/02* (2006.01)
  *G06N 5/04* (2006.01)
  *G06F 15/18* (2006.01)
(52) U.S. Cl. .................. 706/47; 706/59; 706/61

(58) Field of Classification Search .............. 706/45
See application file for complete search history.

(56) References Cited

U.S. PATENT DOCUMENTS

| 5,019,961 | A | 5/1991 | Addesso et al. |
| 6,321,205 | B1 | 11/2001 | Eder |
| 2003/0069983 | A1 | 4/2003 | Mukund |
| 2004/0139053 | A1 | 7/2004 | Haunschild |

OTHER PUBLICATIONS

Syrjanen, A Rule-Based Formal Model for Software Configuration, pp. 1-75 1999.*
Wedemeijer, L. et al., "Conceptual process models: using process . . . " AN-8280364; 2004.
Kerrigan, S. et al.; "Logic-Based Regulation Compliance Assistance" 2003.
Schwaig, KS. et al.; "Privacy, Fair Information Practices and the Fortune 500: The Virtual Reality of Compliance" 2005.

* cited by examiner

*Primary Examiner*—Michael B. Holmes
*Assistant Examiner*—Nathan H Brown, Jr.
(74) *Attorney, Agent, or Firm*—Scully, Scott, Murphy & Presser, P.C.

(57) ABSTRACT

A method for rule compliance situation checking is provided. The method in one aspect, includes the steps of: a) building a rule model for predefined rules and building a business operational model for business processes; b) normalizing vocabularies in the rule model and the business operational model; c) checking whether the rule model is satisfied by the business operational model; and d) outputting a report on checking results. The present invention also provides a corresponding system for rule compliance checking. The rule compliance checking of the present invention allows users to perform fast and effective automatic checking of rule compliance, avoid interference of man-made factors in checking process to a great extent and thus guarantee veracity of checking results.

26 Claims, 7 Drawing Sheets

METHOD FOR RULE COMPLIANCE SITUATION CHECKING AND RELATED CHECKING SYSTEM

RELATED APPLICATIONS

This application is a continuation of U.S. Ser. No. 11/511,772, filed Aug. 29, 2006, the entire contents of which are incorporated herein by reference.

FIELD OF THE INVENTION

The present invention relates to rule compliance checking, and more particularly, to a method and apparatus for checking whether business processes comply with predefined compliance rules, and a computer program product for implementing the checking method.

BACKGROUND OF THE INVENTION

Almost every enterprise, regardless of industry, needs to face various compliance rules that might affect decisions of the enterprise. For instance, any enterprise must comply with laws and regulations issued by their countries as well as guild regulations and practices of the industry to which it belongs while running business operations. In order to efficiently manage business operations, enterprises often prescribe some specific bylaws for their business themselves. In addition, if enterprises want to do international trades, they are required to comply with some international accords or regulations. Enterprises should guarantee their business operations to comply with these regulations, not only because their supervisions often check the situation of compliance with laws and regulations but also because compliance with these compliance rules can protect their lawful interests. Thus, compliance with laws/regulations is very important to business operations of enterprises.

Currently, whether business operations comply with rules is usually checked manually. In the course of checking, one or a group of professionals with a good command of various laws and regulations and enterprise business operations are required so as to make a comparison or judgment between business operations and predefined compliance rules one by one, using some manual method.

Such a conventional method, which relies on human experience and judgment, can check the situation of compliance with corresponding rules (laws and regulations) of only one business operational process every time, and hence, it is not advantageous to multiple checking on plural business operational processes. Besides, such manual checking can hardly or cannot effectively reuse information resources generated during the preceding checking. For instance, one identical rule might be parsed again and again in the course of compliance situation checking on different business operational processes. Moreover, the crux is that manual checking is subject to man-made factors. Due to differences of specific operating personnel in experience, perception and proficiency level, an obtained compliance checking report might have various results, which rebates the reliability and veracity of the report to a great extent.

In summary, the manual mechanism in the prior art for checking whether business operations comply with predefined compliance rules has a multitude of inherent defects, and consequently, it cannot meet much higher requirement of modern enterprises on veracity of regulation compliance checking report, high efficiency of checking process and other aspects.

SUMMARY OF THE INVENTION

To overcome defects in the prior art, the present invention provides a method and apparatus capable of checking automatically whether business operations comply with predefined rules, as well as a computer program product implementing the method.

According to an aspect of the present invention, provided is a method for rule compliance situation checking, including the steps of: a) establishing compliance rule models for predefined compliance rules and establishing business operational models for business processes; b) normalizing vocabularies in the compliance rule models and the business operational models; c) checking whether the compliance rule models are satisfied by the business operational models; and d) outputting a report on checking results.

According to another aspect of the present invention, provided is a system for rule compliance situation checking, comprising: a compliance rule model repository for storing compliance rule models established for predefined compliance rules; a business operational model repository for storing business operational models established for business processes; normalization means for normalizing vocabularies in the compliance rule models and the business operational models; a checking engine for checking whether the compliance rule models are satisfied by the business operational models; and reporting means for generating and outputting a checking result report.

Using the method and system for rule compliance situation checking according to the present invention, users can perform fast and effective automatic checking of rule compliance situation, which avoids interference of man-made factors in checking process to a great extent and thus guarantees accuracy of checking result. Furthermore, business operational and predefined compliance rules are reserved in corresponding storage repositories after computer modeling and processing, so that users can not only do different rule compliance checking on one identical business operational model but also check different business operational models repeatedly using the same compliance rule model. As a result, the advantage of repeated reusing of the same model saves significantly human resource and time. In addition, the computer aided rule compliance checking can easily take tactical adjustments and support users' varied needs conveniently and rapidly.

The present invention also provides storage medium with a machine-readable computer program, the computer program comprising instructions for enabling a processor to implement the method according to the present invention.

Other characteristics and advantages of the present invention will become more apparent from the detailed description of the embodiments of the present invention with reference to the accompanying drawings.

DESCRIPTION OF THE PREFERRED EMBODIMENTS

Hereinafter, the detailed embodiments of the present invention will be described in combination with the accompanying drawings.

Figure 1:
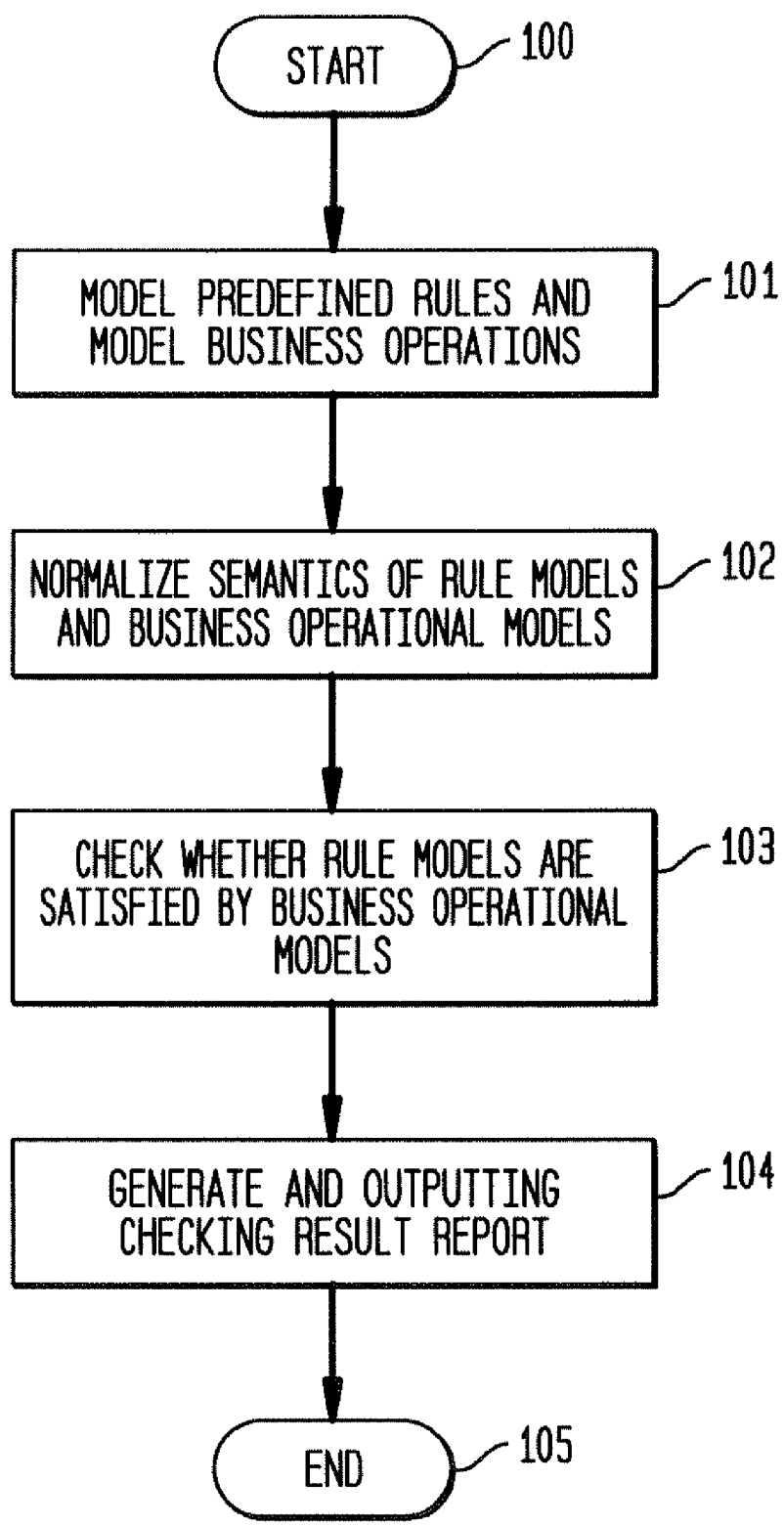
FIG. 1 is a summary flow chart of rule compliance situation checking according to an embodiment of the present invention.

FIG. 1 is a summary flow chart of rule compliance situation checking according to an embodiment of the present invention. The processing starts with step 100. In step 101, predefined compliance rules described in natural language, e.g. laws and regulations, are abstracted as computer-processible mathematical or logical models, and business operational models are built for enterprises, government departments and other organizations in the real world using business operational modeling tools.

In step 102, vocabularies used in the models are normalized. That is, the compliance rule models and the business operational models built in step 101 are semantically normalized so as to conduct match checking with respect to the definitions and relations thereof.

In step 103, it is checked whether the above compliance rule models are satisfied by the above business operational models, so as to determine whether the business operation complies with predefined compliance rules. In step 104, a checking result report reflecting rule compliance situation of the business is automatically generated and output. Eventually, the processing flow ends with step 105.

Hereinafter, each of the steps is described in detail in the order of steps in the flowchart as shown in FIG. 1. First, explanation is given on how to build corresponding models for predefined compliance rules, e.g. laws and regulations, and for business operations respectively in FIG. 1 (step 101). It should be understood here that, although the processes of building the two models are explained in certain order, the models can be built in parallel or accordance with whatever needs.

For rules such as laws and regulations that are usually described in natural language, it is hard to directly process these natural languages during automatic computer processing. Therefore, there is a need to re-define such compliance rules described in natural language into a computer-processible form. For instance, a definition language may be utilized to extract various basic concepts as well as the logic relations among the concepts from a compliance rule and then abstract the compliance rule as a logical formula. In an embodiment of the present invention, the definition rule defines 11 kinds of concepts used for abstract rules, including: Action, Actor, Resource, Organization, Time, Cost, Trigger, Artifact, Location, Principle and Purpose; as well as all possible relations between these 11 concepts. Actually, selection of these concepts is not limited to an absolute standard, and users can define different concepts in their language and define different relations to denote the relationship among concepts, in accordance with variant needs.

Figure 2:
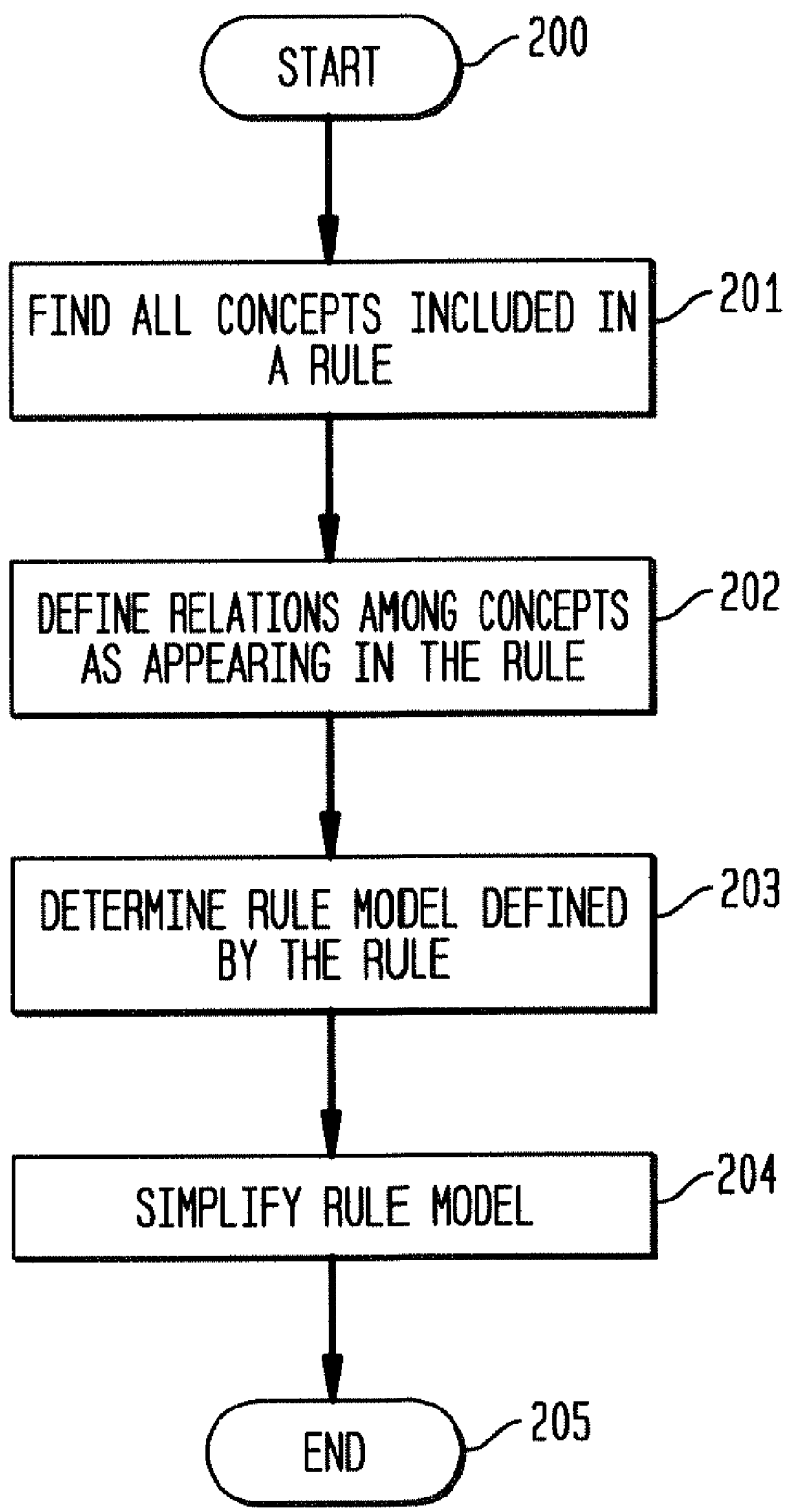
FIG. 2 is a schematic flow chart of compliance rule model establishment according to an embodiment of the present invention.

FIG. 2 is a schematic flow chart of compliance rule model establishment according to an embodiment of the present invention. Here, a specific regulation is used to explain rule modeling in detail. For instance, the regulations of "Public issuance of securities must conform to the criteria prescribed by laws and administrative regulations, and be submitted to the securities supervision and administration institution under the State Council or the departments authorized by the State Council according to law for verification and approval or examination and approval; no unit or individual shall, without verification and approval or examination and approval according to law, publicly issue securities in society." (*China Securities Law, Chapter II, Article* 10), is modeled as an example.

First, the processing of rule modeling starts with step 200. In step 201, all the concepts included in the rule are found. For example, the following concepts are included in the above-mentioned regulations:

Action: "public issuance of securities", "submit application for issuance of securities";

Trigger: "verification and approval or examination and approval";

Organization: "securities supervision and administration institution under the State Council", "departments authorized by the State Council";

Principle: "criteria prescribed by laws and administrative regulations", "law";

Purpose: "verification and approval or examination and approval".

In step 202, the relations among the concepts appearing in the rule are defined. Hereinafter, the relations among the aforesaid concepts are indicated in a form of function:

Concept 1_Concept 2_Relation (Concept 1 (content), Concept 2 (content))

This function denotes the interrelation among the specific contents of "Concept 1" and "Concept 2". For example, the following relations are contained in the aforesaid regulations:

Action_Principle_with (Action ("public issuance of securities"), Principle ("criteria prescribed by laws and administrative regulations")), indicating the criterion that "public issuance of securities" must comply with "criteria prescribed by laws and administrative regulations";

Action_Trigger_export (Action ("submit application for issuance of securities"), Trigger("verification and approval or examination and approval")), indicating the logic relation that "submit application for issuance of securities" exports "verification and approval or examination and approval";

Trigger_Organization_from (Trigger ("verification and approval or examination and approval"), Organization ("securities supervision and administration institution under the State Council")), indicating the regulation that "verification and approval or examination and approval" must be conducted by "securities supervision and administration institution under the State Council";

Trigger_Organization_from (Trigger ("verification and approval or examination and approval"), Organization ("departments authorized by the State Council")), indicating the regulation that "verification and approval or examination and approval" must be conducted by "departments authorized by the State Council";

Action_Action_until (Action ("submit application for issuance of securities"), Action ("public issuance of securities")), indicating the time sequence from "submit application for issuance of securities" till "public issuance of securities";

Action_Principle_with (Action ("submit application for issuance of securities"), Principle ("law")), indicating the criterion that "submit application for issuance of securities" must conform to "law";

Action_Purpose for (Action ("submit application for issuance of securities"), Purpose ("verification and approval or examination and approval")), indicating that the purpose of "submit application for issuance of securities" is to obtain "verification and approval or examination and approval".

In step 203, a formalized rule model corresponding to the rule (e.g. laws and regulations) is determined. For instance, the aforesaid regulations can be defined as:

operators for connecting the concepts; and the notes on the arrows denote the relation predicates among the concepts.

Figure 4:
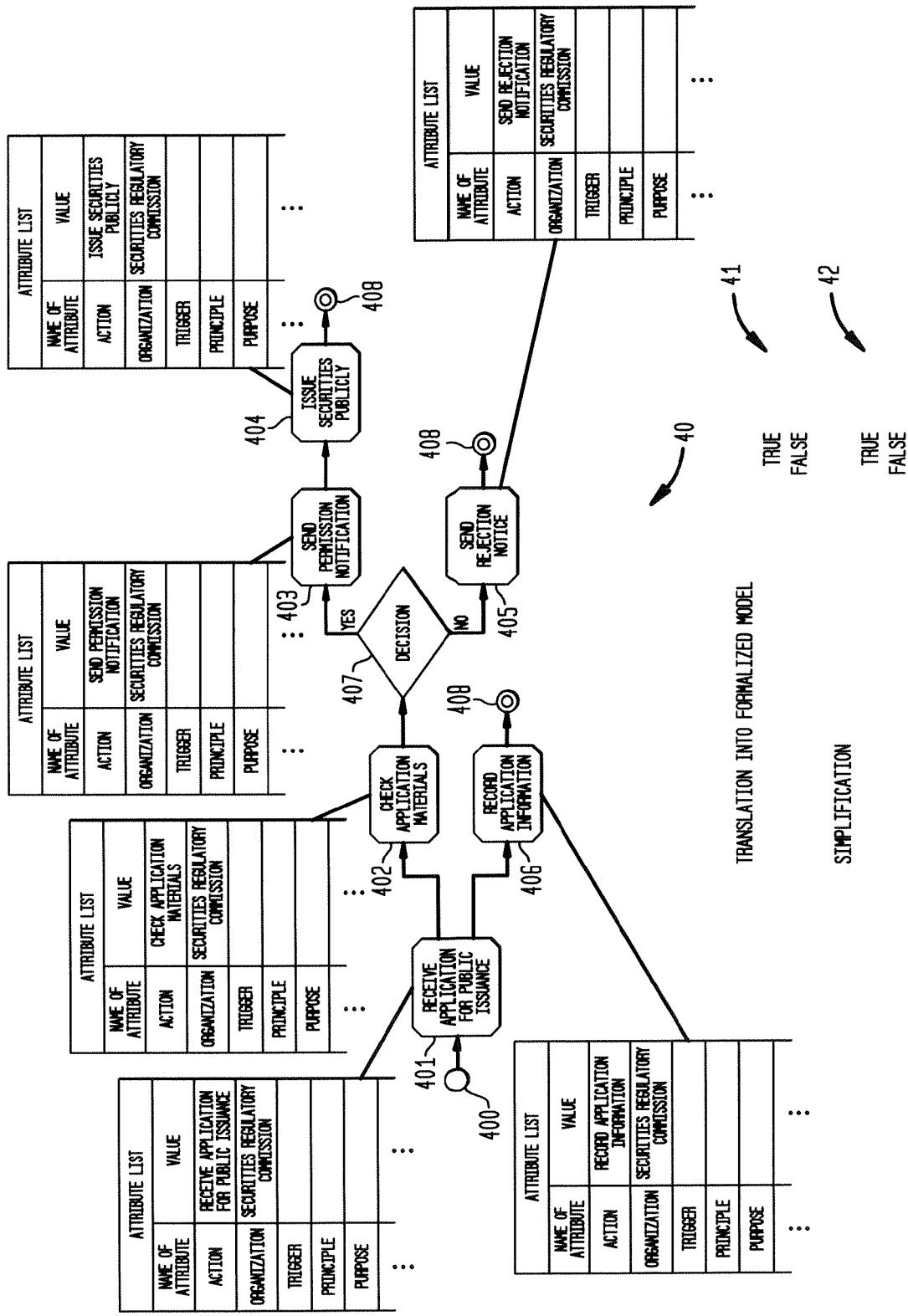
FIG. 4 is a schematic view of a business operational model, its formalized model and its simplified model according to an embodiment of the present invention.

Referring to the accompanying drawings, building of business operational models is described in detail below. FIG. 4 is a schematic view of a business operational model, its formalized model and its simplified model according to an embodiment of the present invention, wherein reference numeral 40 denotes a business operational model built for public issuance of securities, reference numeral 41 denotes a Petri-Nets formalized model of the aforesaid model, and reference numeral 42 denotes a simplified model of the formalized model 41.

```
IF Occurrence (Action (public issuance of securities))
THEN
Action_Principle_with (Action ("public issuance of securities"), Principle ("criteria
prescribed by laws and administrative regulations"))
AND
Action_Trigger_export (Action ("submit application for issuance of securities"), Trigger
("verification and approval or examination and approval"))
AND
{
Trigger_Organization_from (Trigger ("verification and approval or examination and
approval"), Organization ("securities supervision and administration institution under the
State Council"))
OR
Trigger_Organization_from (Trigger ("verification and approval or examination and
approval"), Organization ("departments authorized by the State Council"))
}
AND
Action_Action_until (Action ("submit application for issuance of securities"), Action
("public issuance of securities"))
AND
Action_Principle_with (Action ("submit application for issuance of securities"), Principle
("law'))
AND
Action_Purpose_for (Action ("submit application for issuance of securities"),
Purpose ("verification and approval or examination and approval"));
In step 204, the defined compliance rule model is simplified. For instance, the compliance
rule model for the aforesaid regulations may be simplified as:
IF Occurrence (Action ("public issuance of securities"))
THEN
Action_Action_until (Action ("submit application for issuance of securities"))
With
(Principle ("criteria prescribed by laws and administrative regulations")
AND Principle ("law"))
For
Purpose ("verification and approval or examination and approval")
Export
Trigger ("verification and approval or examination and approval")
From
(Organization ("securities supervisions and administration institution under the State
Council")
OR Organization ("departments authorized by the State Council",))
Action ("'public issuance of securities'))Finally, the processing on compliance rule modeling
ends with step 205.
```

The process of compliance rule modeling is described above in detail. It should be noted that, the step of simplifying the defined compliance rule model in step 204 is not indispensable but optional. However, those skilled in the art understand that such simplification makes subsequent processing much simpler and more intuitive.

Figure 3:
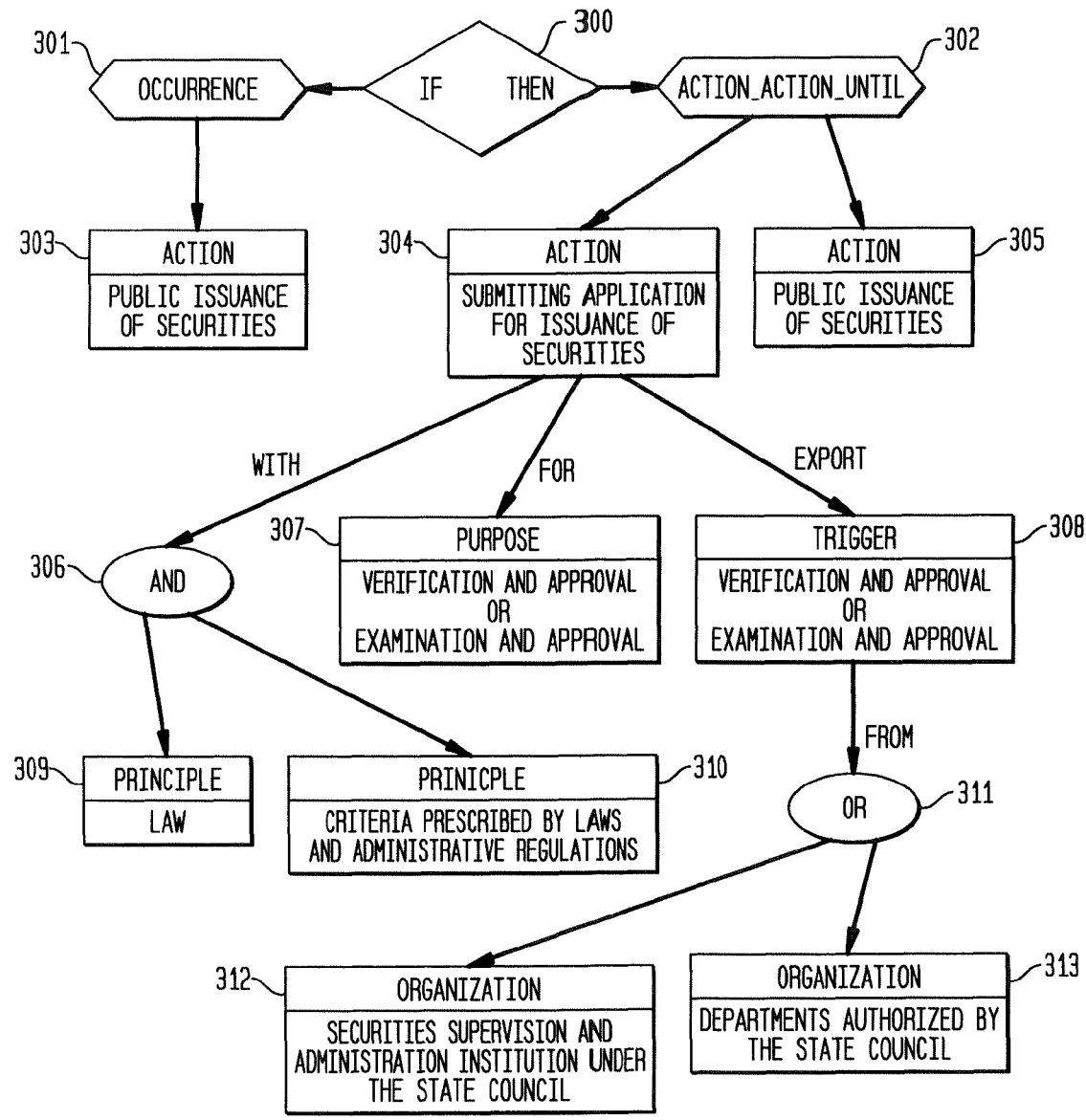
FIG. 3 is a schematic view of a visualized compliance rule tree corresponding to a simplified compliance rule model.

In order to make the compliance rule model more intuitive, preferably, the model may be visualized as a rule tree. FIG. 3 shows a visualized rule tree of the compliance rule model simplified in step 204. As shown in FIG. 3, root node 300 denotes the logic structure of "IF . . . THEN"; nodes 301 and 302 denote the relations among the concepts of the rule; nodes 303, 304, 305, 307, 308, 309, 310, 312 and 313 denote the concepts in the aforesaid rule; nodes 306 and 311 are logical As shown in FIG. 4, existing computer tools for business operation modeling may be used to build the business operational model 40. Included in the business operational model 40 are: start node 400, task nodes 401, 402, 403, 404, 405 and 406, decision mode 407 as well as a plurality of end nodes 408, which are logically connected via arrows. The start node denotes start of the business process. The end nodes denote every possible end of the business process. The task nodes denote a task needed to be carried out currently. The decision node means to make judgment on the basis of the current state and select one from the neighboring tasks denoted by the plurality of subsequent task nodes as the task to be performed next according to the result of judgment.

Each of the task nodes corresponds to an attribute list for describing the task. On the attribute list, there are recorded attribute values of the node, which corresponds to the predefined attributes. In the present embodiment, attributes such as "Action", "Organization", "Trigger", "Principle" and "Purpose" are defined for each task node. For instance, the attribute "Action" defines the action performed by the task node and may be used as a name for identifying the task node; the attribute "Organization" defines the body performing the task; "Trigger" defines the premise of performing the task, the value of which may be the occurrence of "Action" of the preceding task node by default; the attribute "Principle" defines the principle to be observed while carrying out the task; the attribute "Purpose" defines the purpose of carrying out the task, etc. For a specific task node, its meaningless attributes or attributes which do not need to be specifically defined may be set as null. For instance, for the task node 401, the attribute value of "Action" is "receive application for public issuance", defining the task to be carried out currently; the attribute of "Organization" is "securities regulatory commission", defining the body carrying out the task of "receive application for public issuance"; and the attributes "Principle" and "Purpose" do not have corresponding definition values set, but are set as null.

It is to be understood to those skilled in the art that the attributes of a task node may be increased or reduced in accordance with the domain of the current business operational model. In order to make a comparison between business operational model and compliance rule model in a more effective way, it is better to define types of the attributes of a task node as corresponding to types of the concepts of a compliance rule model.

Moreover, it is better to formalize the above business operational model 40, transforming into a computer-processible formalized model. A plurality of methods can be utilized to formalize the business operational model, such as Petri Nets, Process Algebras, Z method, B method, Communicating Finite State Machine, and so on. FIG. 4 shows schematically only the Petri Nets-formalized model 41 and its simplified model 42 of the business operational model 40.

It is to be understood that, although the business operational model is formalized and simplified, the formalized and simplified models still keep the logical relations of the original business operational model and each of the nodes is still restricted by the attributes of the corresponding task node. That is to say, the formalization and simplification does not change the substantive contents of the business operational model, but facilitates the business operational model to be processed more easily in subsequent steps.

Next, the step (step 102) of normalizing compliance rule model and business operational model in the flow chart shown in FIG. 1 is described. Due to difference in domain that a model belongs to, focal angle and subjective describing manner of a model builder in the course of modeling, the following situation is likely to arise: terms (vocabularies, describing manners etc.) contained in compliance rule model and business operational model and used for the same concept, relation or those concept and relation which can be currently deemed identical are different. For example, in the above-described compliance rule model, the concept "Organization" includes "securities supervision and administration institution under the State Council" and "departments authorized by the State Council"; while in the business operational model, the "Organization" attribute of the task node is expressed as "securities regulatory commission". Although "securities supervision and administration institution under the State Council" or "departments authorized by the State Council" and <"securities regulatory commission" have the same meaning and function in the context, but they are different in expression. In this case, it is very difficult to conduct rule compliance situation checking on compliance rule model and business operational model. Therefore, it is necessary to normalize compliance rule model and business operational model prior to checking, so as to achieve term consistence. That is, "securities supervision and administration institution under the State Council" or "departments authorized by the State Council" and "securities regulatory commission" are assumed to be the same concept. In addition, even if the terms used in the two models are made consistent at the beginning of modeling (which is usually quite difficult, labor intensive and costly because of large amount of vocabularies), there is still a need to assume the consistence of these terms before checking. Therefore, such a normalization step of assuming the consistence of terms between two models is highly necessary and critical to the whole method for rule compliance situation checking.

A feasible mechanism of model semantic normalization is to build a standard vocabulary repository and then enforce semantic consistence or confirm semantic consistence between the two models by using the standard vocabulary repository. In this solution, an arrangement manner similar to synonymous vocabulary repository may be adopted to classify numerous different vocabularies and expressions as synonymous and then make models consistent when there is synonym in them. This normalization mechanism allows a certain level of fuzzy processing. For example, by defining parasynonyms and selectively making parasynonyms consistent with each other, fuzzy processing of modeling semantic normalization is realized.

Of course, the implementation of strict normalization process on the model may render subsequent checking of rule compliance situation comparatively rigorous; while over-fuzzy normalization, though makes the checking environment become flexible, sometimes leads to worthless checking results for reference. This calls for an effective balance in the normalization process. Therefore, a better model normalization method is to introduce man-made selection and judgment while using standard vocabulary repository. For example, it may be decided through interaction with human whether to make two parasynonyms consistent or indicate to make two different expressions to be consistent, etc.

Through the above depiction, those skilled in the art can understand that the above-described model normalization processing and its improvements can be realized in a manner which is known in the present art, such as combination of software program and man-machine interface. Thus, details thereof are omitted.

Figure 5:
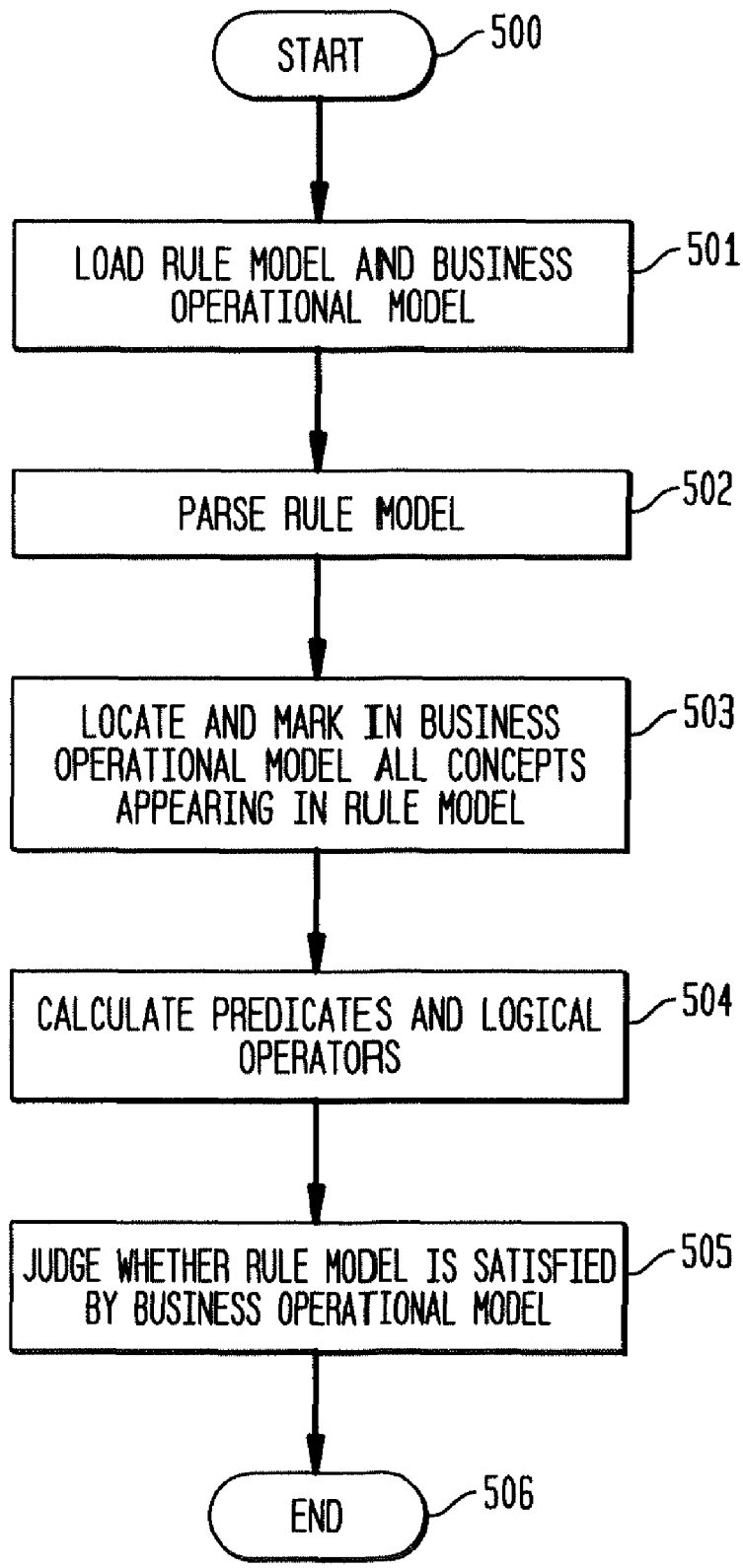
FIG. 5 is a processing flow chart of checking whether a compliance rule model is satisfied by a business operational model according to an embodiment of the present invention.

Referring to FIG. 5, the step (step 103) of checking whether compliance rule model is satisfied by business operational model in the flow chart as shown in FIG. 1 is explained in detail by means of the above-described examples of compliance rule model and business operational model. FIG. 5 is a flow chart of checking whether compliance rule model is satisfied by business operational model according to an embodiment of the present invention. The processing flow starts with step 500. In step 501, the built compliance rule model and business operational model are loaded via the checking engine.

In step 502, the loaded compliance rule model is parsed. For example, the compliance rule model may be simplified and rule tree is built, on the basis of the above-mentioned preferable step when building compliance rule model. As described above, the rule tree obtained from the parsed compliance rule model may include three kinds of nodes: concept node, relation predicate node and logical operator node (refer to FIG. 3).

In step 503, all concepts involved in the compliance rule model are located in the business operational model. If it does exist, the corresponding concept on the rule tree is marked with "True", otherwise, the corresponding concept on the rule tree is marked with "Unknown". For example, on the rule tree of compliance rule model as shown in FIG. 3, the concept nodes include: Action "public issuance of securities" 303 and 305, Purpose "verification and approval or examination and approval" 307, Principle "law" 309, Principle "criteria prescribed by laws and administrative regulations" 310, Organization "securities supervision and administration institution under the State Council" 312, and Organization "departments authorized by the State Council" 313.

In the business operational model as shown in FIG. 4, the aforesaid concept nodes are located one by one. The "Action" concept "public issuance of securities" matches the "Action" attribute of the task node 404, namely "public issuance of securities", and thus, the concept nodes 303 and 305 are marked with "True" in the rule tree. As seen above, after implementing the step of model normalization, the Organization "securities supervision and administration institution under the State Council" 312 and the Organization "departments authorized by the State Council" are semantically made consistent to be the Organization "securities regulatory commission", which match the attribute "Organization" of the task nodes 401, 402, 403, 405 and 406, namely "securities regulatory commission", and then, the concept nodes 312 and 313 are marked with "True" on the rule tree. The Purpose "verification and approval or examination and approval" 307, the Principle "law" 309 and the Principle "criteria prescribed by laws and administrative regulations" 310 do not find the matched attribute items in the business operational model, and then, their nodes are marked with "Unknown". In this way, all the concept nodes in the compliance rule model are located in the business operational model.

In step 504, logical operators and relation predicates are calculated. The logical operators include "AND", "OR" and "NOT". The calculation result returned value of each logical operation is one of "True", "False" and "Unknown". For example, the returned value corresponding to each logical operator may be calculated according to the following tables, where X and Y stand for possible leaf nodes of the logical operator node in the rule tree, respectively.

TABLE 1 the returned values of the logical operator "AND"

| AND | | Y | |
| --- | --- | --- | --- |
| | True | Unknown | False |
| X True | True | Unknown | False |
| Unknown | Unknown | Unknown | False |
| False | False | False | False |

TABLE 2 the returned values of the logical operator "NOT"

| NOT | | |
| --- | --- | --- |
| X | True | False |
| | Unknown | Unknown |
| | False | True |

TABLE 3 the returned values of the logical operator "OR"

| OR | | Y | |
| --- | --- | --- | --- |
| | True | Unknown | False |
| X True | True | True | True |
| Unknown | True | Unknown | Unknown |
| False | True | Unknown | False |

Compared with the calculation of the logical operators, the calculation of the relation predicates is relatively more complicated. Likewise, the calculation result of each relation predicate is one of "True", "False" and "Unknown", where: if the checked business operational model satisfies the relation indicated by the relation predicate, then the calculation result is "True", otherwise the returned value is "False"; if any parameter of the relation predicate is unknown in the current business operational model (i.e., any leaf nodes of the relation predicate is marked with "Unknown" in step 503), the calculation result of the relation predicate is also "Unknown". It can be seen from the above description that, since each predicate stands for a special relation with flexible expression and meaning, unified operation cannot be defined for all predicates. Therefore, it is of necessity to predefine and adopt a different algorithm to calculate its returned value with respect to a different relation predicate.

For example, the values of two leaf concept nodes 312 and 313 of the logical operator "OR" node 311 in the rule tree as shown in FIG. 3 are "True", and then, the returned value of the node 311 is also "True" in accordance with table 2. The values of two conceptual leaf nodes 309 and 310 of the logical operator "AND" node 306 are "Unknown", and then, the returned value of the node 306 is also "Unknown" in accordance with table 1. For another example, when processing the predicate node "Action_Action_until" 302 in the rule tree as shown in FIG. 3, it may be checked in the business process model whether there is the task "submit application for issuance of securities" prior to the task "public issuance of securities". If there is, the value of the node is "True"; if not the value of the node is "False". Thereby, the returned values of all the logical operator nodes and predicate nodes in the compliance rule model as shown in FIG. 3 are determined.

In step 505, it is judged according to the calculation result whether the compliance rule model is satisfied by the business operational model. That is, the returned value of root node is judged in the present embodiment. Similarly, the returned value of the root node is one of "True" indicating that the business operational model is compliant with the compliance rule represented by the compliance rule model, "False" indicating that the business operational model is not compliant with the compliance rule represented by the compliance rule model, and "Unknown" indicating that the compliance situation of the business operational model with respect to the compliance rule is uncertain and more information is needed to make the compliance situation certain.

For example, since the returned values of the two leaf nodes of the root node "IF . . . THEN" 300 in FIG. 3, namely the relation predicate "Occurrence" node 301 and the relation predicate "Action_Action_until" node 302, are "True", the returned value of the root node 300 is also "True". The processing ends with step 506.

As how to check and analyze whether the business operational model satisfies the rule tree is explained above, it should be noted that adjustments and improvements can be made to this specific checking mechanism in accordance with users' needs, so as to meet multi-level requirements arising from checking on different compliance rules and businesses. For example, although the above embodiment sets forth only three kinds of returned values, i.e. "True", "False" and "Unknown", there may be more returned value types for each node so as to indicate different levels that business operational model complies with the compliance rule model.

Besides the described embodiment, this step (step 103) may be implemented using other checking methods known to those skilled in the art. For example, the checking engine utilizes the way, in which semantic parsing program codes semantically parse the compliance rule model and the business operational model, to directly perform semantic match checking so as to obtain a conclusion whether the business operational model satisfies the compliance rule model, etc.

Finally, based on the above checking result, a checking result report on the rule compliance situation is automatically generated and outputted (step 104). Such automatic reporting mechanism may be designed to not only support to generate a written text report, but also support to create a multi-level visualized checking report in accordance with the built compliance rule model, business operational model or the combination thereof. Furthermore, users can define different violation and compliance level, which can be reflected in checking report. Of course, it is to be understood that users' flexibility of defining depends on whether a specific checking mechanism supports complex judgment process and can generate more detailed multi-level checking result data.

Figure 6:
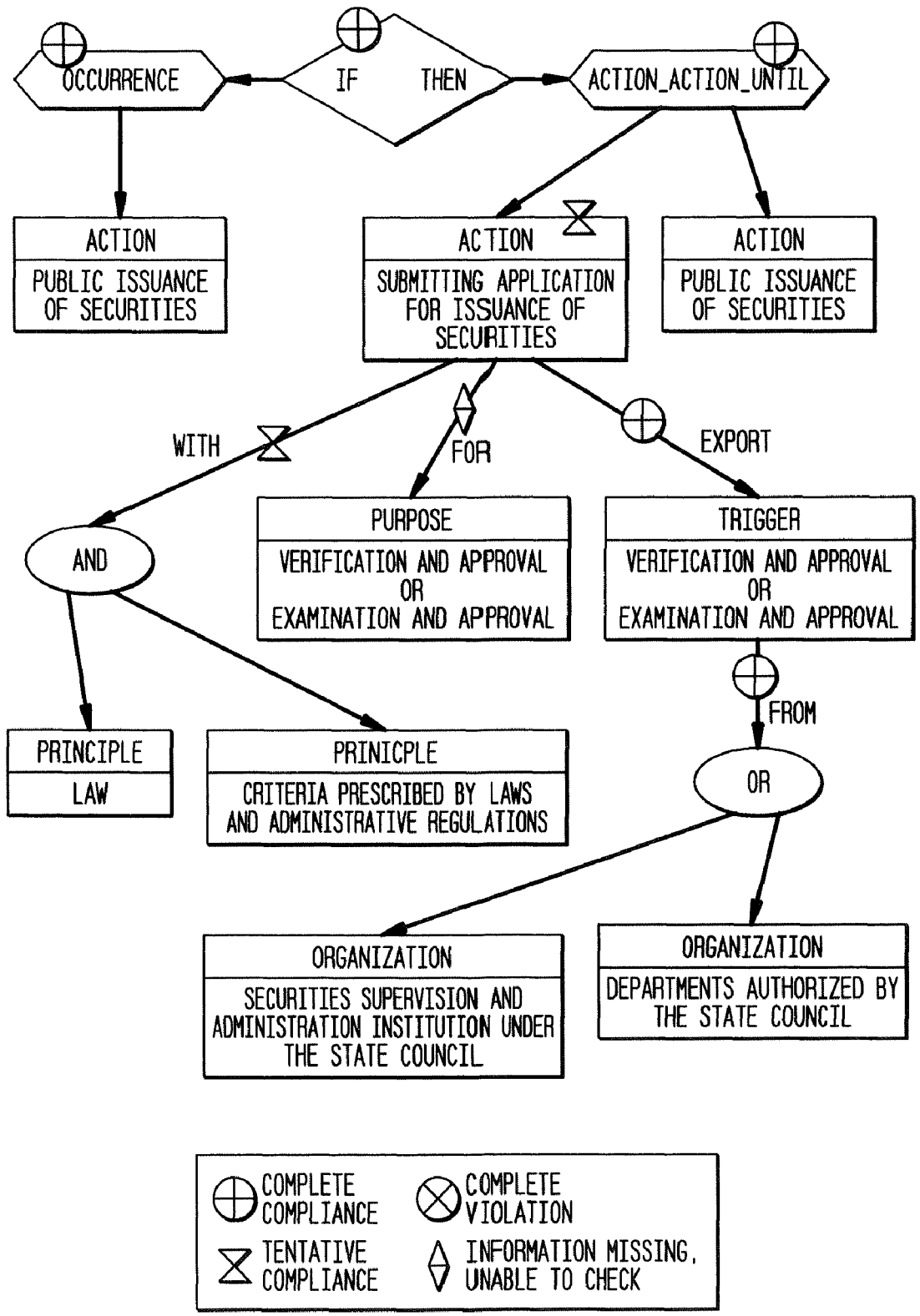
FIG. 6 is a visualized checking result report generated based on a compliance rule model according to an embodiment of the present invention.

For example, FIG. 6 depicts a visualized checking report generated based on compliance rule model according to an embodiment of the present invention. As depicted in FIG. 6, the compliance situation of the business operational model in relation to various relations and logics of the compliance rule in the above embodiment is shown in a form of rule tree, where different graphic symbols are used to exemplarily mark different rule compliance level of each node.

Figure 7:
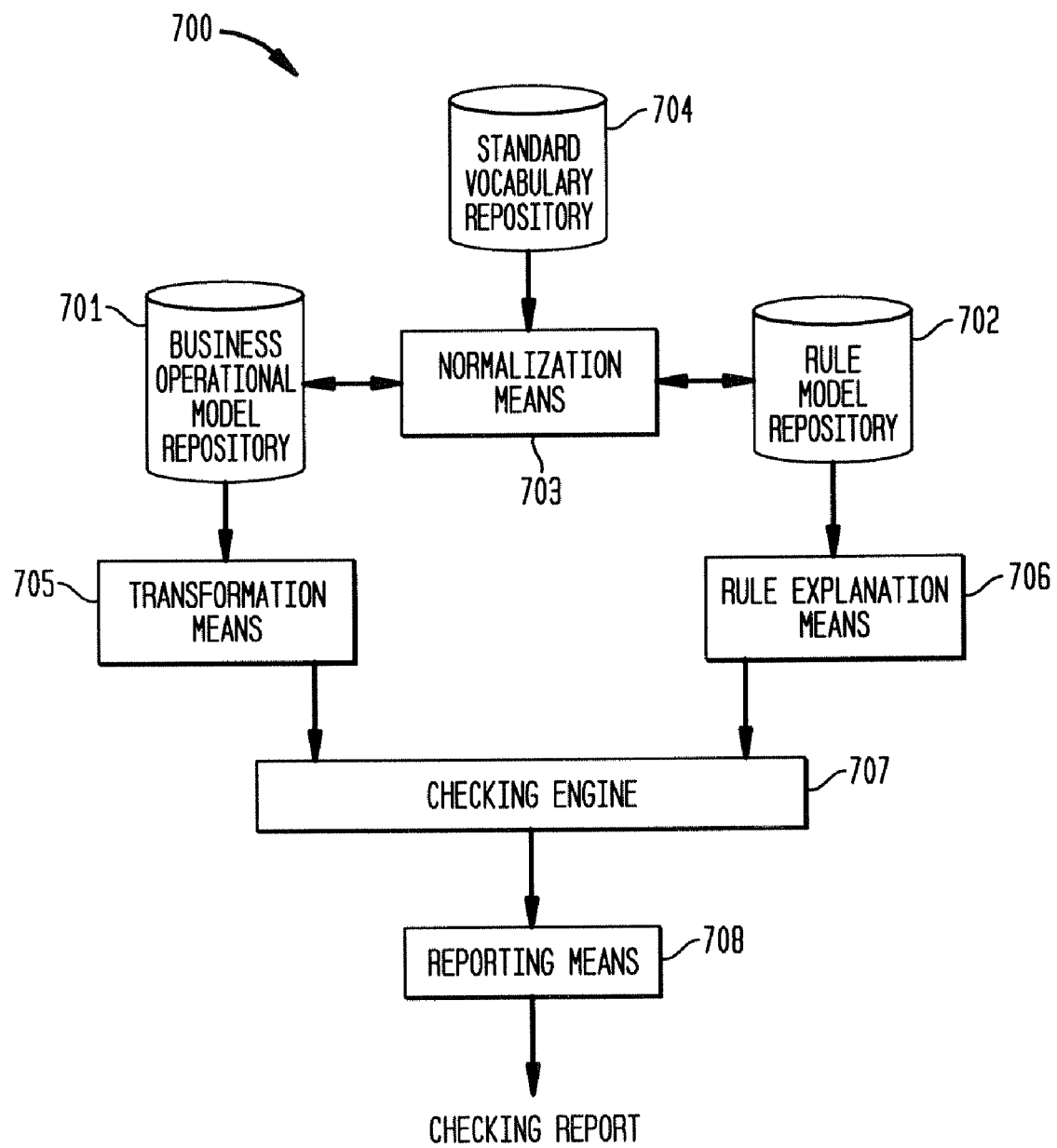
FIG. 7 is a schematic structural block diagram of a system for rule compliance situation checking according to an embodiment of the present invention.

FIG. 7 is a schematic structural block diagram of a system for rule compliance situation checking according to an embodiment of the present invention. In FIG. 7, reference numeral 700 denotes a system for rule compliance situation checking according to an embodiment of the present invention, reference numeral 701 denotes a business operational model repository, reference numeral 702 denotes a compliance rule model repository, reference numeral 703 denotes normalization means, reference numeral 704 denotes a standard vocabulary repository, reference numeral 705 denotes transformation means, reference numeral 706 denotes compliance rule explanation means, reference numeral 707 denotes a checking engine, and reference numeral 708 denotes reporting means.

As shown in FIG. 7, users set up a business operational model which is to be checked with business operation modeling tools (not shown), and then store it in the business operational model repository 701. Also, users set up a compliance rule model with compliance rule modeling tools (not shown) and store it in the compliance rule model repository 702.

The normalization means 703 semantically normalizes the business operational model to be checked which is in the business operational model repository 701 and the compliance rule model to be checked which is in the compliance rule model repository 702, using standard vocabularies of a current checking field provided by the standard vocabulary repository 704. In the system as shown in FIG. 7, the normalized business operational model and compliance rule model are still stored in the business operational model repository 701 and the compliance rule model repository 702 respectively, so that the normalized models can be used repeatedly.

The normalized business operational model is inputted into the transformation means 705 for formalization processing for the business operational model. Afterwards, the formalized business operational model is inputted into the checking engine 707.

In the meantime, the normalized compliance rule model is inputted to the compliance rule explanation means 706 for effective simplification and generating a rule tree preferably. Afterwards, the processed compliance rule model is inputted into the checking engine 707.

It should be pointed out here that, in the checking system as shown in FIG. 7, although it is after the business operational model and the compliance rule model are normalized by the normalization means 703 that they are respectively inputted to the transformation means 705 and the rule explanation means 706 for processing, those skilled in the art can appreciate that the business operational model and the compliance rule model may be first processed by the transformation means 705 and the rule explanation means 706 respectively and then normalized by the normalization means 703, just as described above. The processing order and possible connection relations among corresponding means do not constitute restrictions on the present invention.

In the embodiment as shown in FIG. 7, the checking engine 707 may be the means implementing the processing flow as shown in FIG. 5, for checking whether the inputted business operational model satisfies the inputted compliance rule model and for inputting the checking data into the reporting means 708.

According to the checking data reported by the checking engine 707, and preferably, fewer according to intermediary checking data, the reporting means 708 generates and outputs a checking report. The reporting means 708 can simultaneously support to generate and output a text report and a graphic report.

A structure of a system for rule compliance situation checking is described in conjunction with an embodiment of the present invention. According to other embodiments described above, the system for rule compliance situation checking may have other structures. For example, the normalized business operational model and compliance rule model may be directly inputted into the checking engine, the checking of rule compliance is performed directly by semantically parsing the compliance rule model and the business operational model using semantic parsing program codes. Therefore, the system for rule compliance checking according to the present invention is not limited to the form shown in FIG. 7.

Part of the present invention may be implemented as a sequence or a group of computer executable instructions (computer software) stored in a computer readable storage medium. The computer readable storage medium may be a non-volatile storage medium such as hardware, read-only memory (ROM) means, CD or DVD optical disk, tape and the like.

As the embodiments of the present invention have been described with reference to the accompanying drawings, those skilled in the art may make various modifications and alterations within the scope defined by the claims as appended.

What is claimed is:

1. A computer-implemented method for rule compliance situation checking, including steps of:
   a) building a rule model for predefined rules and building business operational models for business processes;
   b) normalizing vocabularies used in said rule model and said business operational model;
   c) checking whether said rule model is satisfied by said business operational model; and
   d) generating and outputting a checking result report,
   wherein said step b) includes unifying or assuming the unity of expressions used in said rule model and said business operational model using a standard vocabulary repository.

2. The method as claimed in claim 1, wherein step a) includes describing said predefined rules as a rule model in a form of logical formula using at least concepts and relations.

3. The method as claimed in claim 2, wherein said concepts include: action, actor, resource, organization, time, cost, trigger, artifact, location, principle and purpose, and said relations include possible relationships among said concepts.

4. The method as claimed in claim 2, wherein step a) includes simplifying said rule model as a logical expression connected by logical relation symbols and predicates.

5. The method as claimed in claim 4, wherein step a) includes expressing the simplified rule model as a rule tree form.

6. The method as claimed in claim 4, wherein step c) includes steps of:
   loading said simplified rule model and said business operational model;
   locating in said business operational model all concepts involved in said rule model;
   calculating logical operators and predicates in said simplified rule model on the basis of said business operational model; and
   determining whether said rule model is satisfied by said business operational model.

7. The method as claimed in claim 1, wherein said step a) includes formalizing said business operational model.

8. The method as claimed in claim 7, wherein said step a) includes simplifying the formalized business operational model.

9. The method as claimed in claim 1, wherein said step b) further includes unifying or assuming the unity of expressions used in said rule model and said business operational model in accordance with information inputted by a user.

10. The method as claimed in claim 1, wherein step c) includes the steps of:
    parsing semantics of said rule model;
    parsing semantics of said business operational model; and
    performing semantic match checking on the parsed rule model and business operational model so as to determine whether said rule model is satisfied by said business operational model.

11. The method as claimed in claim 1, wherein the checking result report in said step d) defines violation and/or compliance level of said business with respect to said rule.

12. The method as claimed in claim 1, wherein the checking result report in said step d) is a visualized graphic report.

13. A system for rule compliance situation checking, comprising:
    a rule model repository for storing a rule model built for predefined rules;
    a business operational model repository for storing a business operational model built for business processes;
    normalization means for normalizing vocabularies used in said rule model and said business operational model;
    a checking engine for checking whether said rule model is satisfied by said business operational model; and
    reporting means for generating and outputting a checking result report,
    wherein said reporting means is further used for defining in said checking result report violation and/or compliance level of said business with respect to said rule.

14. The system as claimed in claim 13, wherein said rule model is a rule model describing said predefined rules as a form of logical formula at least using concepts and relations.

15. The system as claimed in claim 14, wherein said concepts include: action, actor, resource, organization, time, cost, trigger, artifact, location, principle and purpose, and said relations include possible relationships among said concepts.

16. The system as claimed in claim 14, further comprising: rule explanation means for simplifying said rule model as a logical expression connected by logical relation symbols and predicates, and outputting it to said checking engine; and transformation means for formalizing said business operational model and outputting it to said checking engine.

17. The system as claimed in claim 16, wherein said rule explanation means is further used for expressing the simplified rule model as a rule tree form.

18. The system as claimed in claim 16, wherein said transformation means is further used for simplifying said business operational model after formalization.

19. The system as claimed in claim 16, wherein said checking engine is used for loading said simplified rule model and said formalized business operational model, locating in said business operational model all concepts involved in said rule model, calculating logical operators and predicates in said rule model on the basis of said business operational model, and determining whether said rule model is satisfied by said business operational model and outputting checking data to said reporting means.

20. The system as claimed in claim 13, further comprising: a standard vocabulary repository for providing to said normalization means standard vocabularies in a current field, and said normalization means unifying or assuming the unity of expressions used in said rule model and said business operational model using said provided standard vocabularies.

21. The system as claimed in claim 20, wherein said normalization means unifies expressions used in said rule model and said business operational model in accordance with information inputted by a user.

22. The system as claimed in claim 13, wherein said checking engine is used for loading and parsing semantics of said rule model and said business operational model, performing semantic match checking on the parsed rule model and business operational model to determine whether said rule model is satisfied by said business operational model, and outputting checking data to said reporting means.

23. The system as claimed in claim 13, wherein said reporting means is further used for generating a visualized graphic checking result report.

24. A computer storage medium having a computer readable program embodied in said medium, wherein the computer readable program when executed on a computer causes the computer to execute a method for rule compliance situation checking, including steps of:
    a) building a rule model for predefined rules and building business operational models for business processes;
    b) normalizing vocabularies used in said rule model and said business operational model;

c) checking whether said rule model is satisfied by said business operational model; and d) generating and outputting a checking result report, wherein step a) includes describing said predefined rules as a rule model in a form of logical formula using at least concepts and relations, and simplifying said rule model as a logical expression connected by logical relation symbols and predicates.

25. A computer storage medium having a computer readable program embodied in said medium, wherein the computer readable program when executed on a computer causes the computer to execute a method for rule compliance situation checking, including steps of;

a) building a rule model for predefined rules and building business operational models for business processes;

b) normalizing vocabularies used in said rule model and said business operational model;

c) checking whether said rule model is satisfied by said business operational model; and d) generating and outputting a checking result report, wherein said step a) includes formalizing said business operational model and simplifying the formalized business operational model.

26. A computer storage medium having a computer readable program embodied in said medium, wherein the computer readable program when executed on a computer causes the computer to execute a method for rule compliance situation checking, including steps of:

a) building a rule model for predefined rules and building business operational models for business processes;

b) normalizing vocabularies used in said rule model and said business operational model;

c) checking whether said rule model is satisfied by said business operational model; and d) generating and outputting a checking result report, wherein said step b) includes unifying or assuming the unity of expressions used in said rule model and said business operational model using a standard vocabulary repository.

* * * * *